W. M. CARTER.
TIRE DISPLAY SUPPORT.
APPLICATION FILED AUG. 30, 1920.
1,388,848.
Patented Aug. 30, 1921.
2 SHEETS—SHEET 1.
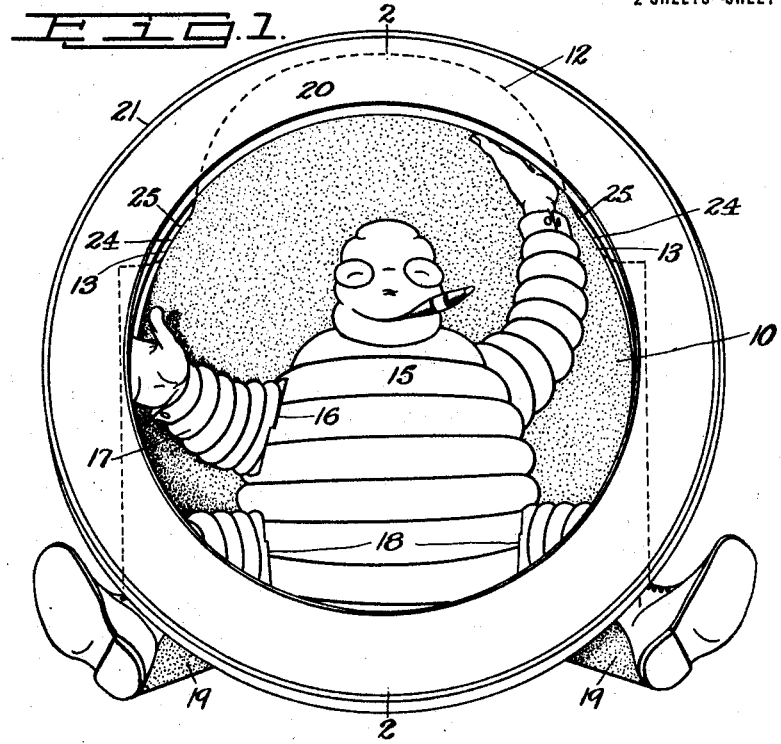
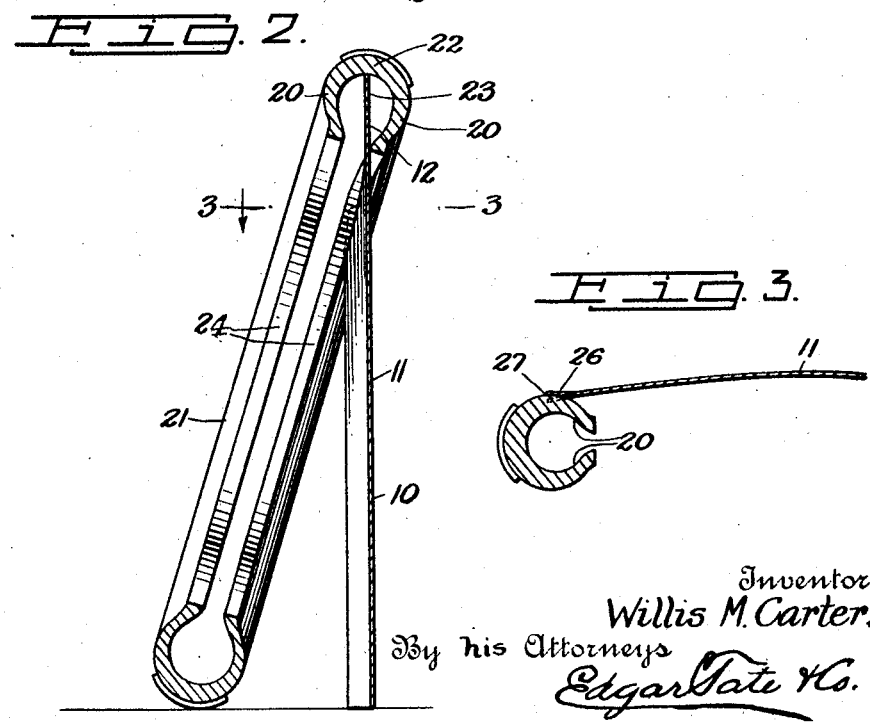
Inventor
Willis M. Carter.
By his Attorneys
Edgar Tate & Co.

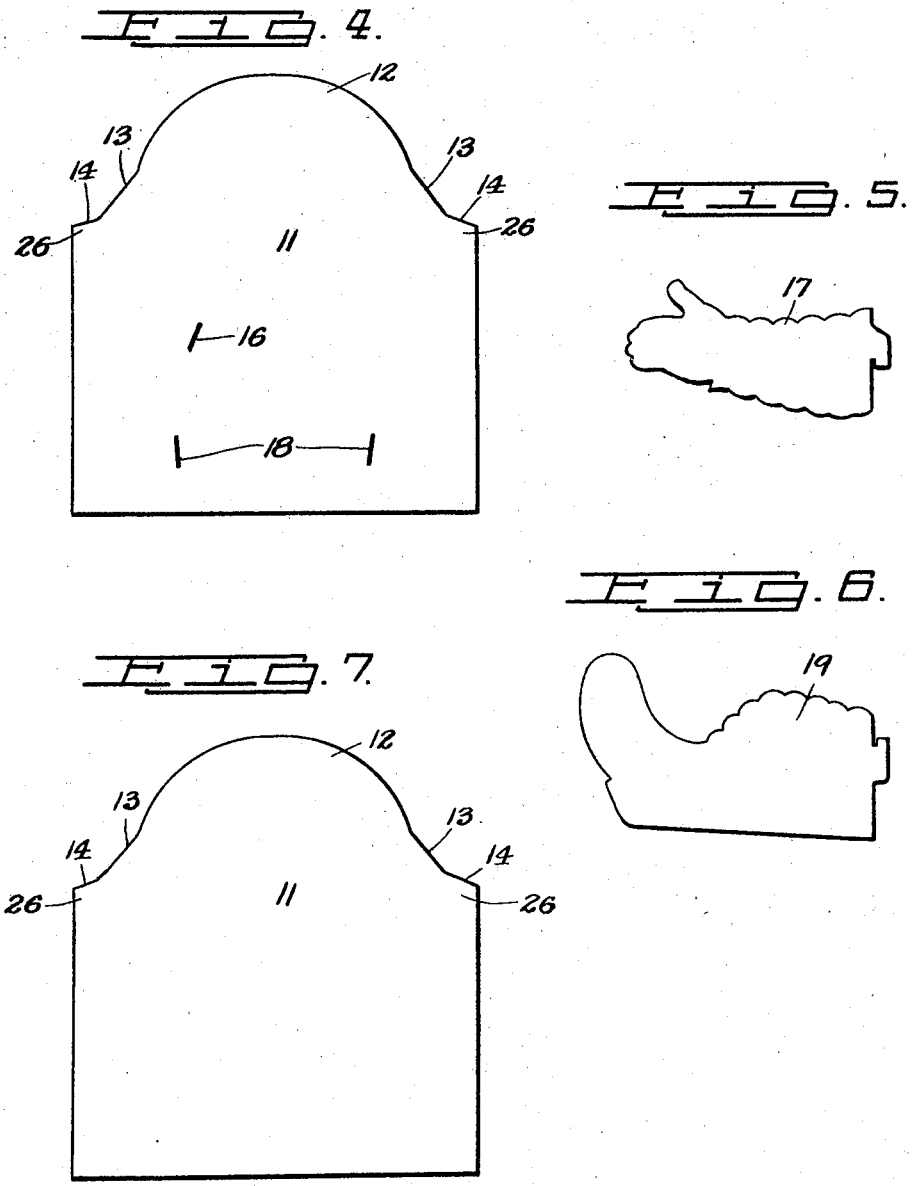

UNITED STATES PATENT OFFICE.

WILLIS M. CARTER, OF JERSEY CITY, NEW JERSEY, ASSIGNOR TO THE W. F. POWERS COMPANY, OF NEW YORK, N. Y., A CORPORATION OF NEW YORK.

TIRE-DISPLAY SUPPORT.

1,388,848.     Specification of Letters Patent.     Patented Aug. 30, 1921.

Application filed August 30, 1920. Serial No. 406,744.

*To all whom it may concern:*

Be it known that I, WILLIS M. CARTER, a citizen of the United States, and residing at Jersey City, in the county of Hudson and State of New Jersey, have invented certain new and useful Improvements in Tire-Display Supports, of which the following is a specification, such as will enable those skilled in the art to which it appertains to make and use the same.

This invention relates to tire supports and particularly to devices of this class designed to support pneumatic tires placed on display, and said supports containing advertising or other display matter for the tire supported thereby, said advertising or display matter being readable wholly or partially through the tire opening; and with this and other objects in view the invention consists in a support and display device of the class and for the purpose specified, which is simple in construction and efficient in use and which is constructed as hereinafter described and claimed.

The invention is fully disclosed in the following specification, of which the accompanying drawing forms a part, in which the separate parts of my improvement are designated by suitable reference characters in each of the views, and in which:—

Figure 1 is a front view of my improved support and display device and showing a tire supported thereby;

Fig. 2 a partial section on the line 2—2 of Fig. 1 and with part of the construction shown in Fig. 1 omitted;

Fig. 3 a partial section on the line 3—3 of Fig. 2;

Fig. 4 a plan view of the support shown in Fig. 1 of the drawing in blank form;

Figs. 5 and 6 are detail plan views of parts of the construction employed in Fig. 1; and, Fig. 7 a plan view of the support as shown in Fig. 2 in blank form.

In the construction shown in Figs. 1, 4, 5 and 6 of the drawing, I provide a tire support or display device 10 comprising a back member 11 which is approximately rectangular in form and is preferably composed of heavy cardboard but may be composed of any sheet material, and the upper end portion of the back member 11 is provided with a central arc-shaped projection 12 at the opposite sides of which the side edges of the back member 11 are beveled as shown at 13 and 14.

As shown in Fig. 1 the back member 11 is provided on one side face thereof with an advertising picture 15, and said back member is provided with an elongated aperture 16 to receive a detachable arm 17 shown assembled in Fig. 1 and in detail blank form in Fig. 5. The back member 11 is also provided adjacent to the lower edge portion thereof with two elongated apertures 18 adapted to receive two leg members 19 shown assembled in Fig. 1, and one of which is shown in detail blank form in Fig. 6 of the drawing.

In the use of the support and display device shown in Figs. 1, 4, 5, and 6 the upwardly directed arc-shaped portion 12 of the back member 11 is placed between the opposite sides 20 of a pneumatic tire 21, and the top edge of said projecting portion 12 rests within the tread portion 22 of the tire as clearly shown at 23 in Fig. 2 of the drawing and as indicated in dotted lines in Fig. 1. The rim portion 24 of the tire rests upon the beveled edge portions 13 of the back member as shown at 25, while the corner portions 26 of the back member formed by the beveled edges 14 rest upon one of the sides 20 of the tire as indicated at 27 in Fig. 3 of the drawing.

It will be noted on a consideration of Figs. 2 and 3 of the drawing that the back member 11 is slightly curved in horizontal section when in use but the said back member assumes a vertical or substantially vertical position, while the tire 21 assumes an inclined position as clearly illustrated in Fig. 2 of the drawing, and said back member serves to support the tire in such position and in reality forms an easel support for such tire.

With the construction shown in Figs. 1, 4, 5 and 6, the arm member 17 is connected with the back member 11 and the hand portion of said arm member is placed between the sides 20 of the tire, as indicated in Fig. 1 of the drawing. The leg members 19 are connected with said back member and are extended at the opposite sides of the lower end portion of the tire when on display, and are located in the back thereof to produce the display effect illustrated in Fig. 1 of the drawing.

Of course, my invention is not limited to any specific character of display on the back member 11 and any suitable advertising or display matter may be provided depending upon the character of the tire placed on display, or by whom such tire is manufactured. In Figs. 2 and 7 of the drawing I have shown a support and display device comprising a back member 11 which is similar in all respects to the back member 11 shown in Figs. 1, 4, 6 and 7 of the drawing, except that the apertures 16—18 are omitted, and in this form of construction it will be apparent that the display device is of simple form and construction and advertising or display matter will appear on one side face thereof, and the arms and leg members or other attaching parts are omitted.

The beveled edge portions 14 on the back member 11 of the display device are not absolutely necessary and may or may not be employed, all that is necessary being to extend the side portions of the back member sufficiently to close the opening in the tire, or, in other words, it is desirable to provide a support of the class described, the transverse dimensions of which are greater than the transverse dimensions of the tire opening when viewed from the front so that the advertising or display matter on said device will entirely fill the tire opening as is illustrated in Fig. 1 of the drawing.

Having fully described my invention, what I claim as new and desire to secure by Letters Patent, is:—

1. A tire display support comprising an approximately rectangular sheet the top portion of which is provided with an upwardly directed extension adapted to be placed between the sides of a tire and upon which the tread portion of the tire is adapted to rest to support said tire in an inclined position, beveled portions at the opposite sides of said upwardly directed portion upon which the rim portion of the tire is adapted to rest, and the opposite sides of the support being provided with parts adapted to bear on one of the sides of said tire.

2. A tire display support comprising a sheet of suitable material fashioned to the desired form and provided with an upwardly directed arc-shaped portion at the opposite sides of which the side edge portions of the sheet are beveled, and display members detachably connected with said sheet.

In testimony that I claim the foregoing as my invention I have signed my name in presence of the subscribing witnesses this 19th day of August, 1920.

WILLIS M. CARTER.

Witnesses:
C. E. MULREANY,
W. E. THOMPSON.